US012625760B2

(12) United States Patent
Garg et al.

(10) Patent No.: US 12,625,760 B2
(45) Date of Patent: May 12, 2026

(54) SYSTEM AND METHOD FOR MACHINE-TO-MACHINE RE-IMAGING

(71) Applicant: Bank of America Corporation, Charlotte, NC (US)

(72) Inventors: Saurabh Garg, Faridabad (IN); Maneesh Kumar Sethia, Hyderabad (IN); Shailendra Singh, Thane West (IN)

(73) Assignee: Bank of America Corporation, Charlotte, NC (US)

( * ) Notice: Subject to any disclaimer, the term of this patent is extended or adjusted under 35 U.S.C. 154(b) by 49 days.

(21) Appl. No.: 18/479,497

(22) Filed: Oct. 2, 2023

(65) Prior Publication Data

US 2025/0110823 A1 Apr. 3, 2025

(51) Int. Cl.
*G06F 11/00* (2006.01)
*G06F 11/07* (2006.01)
*G06F 11/10* (2006.01)

(52) U.S. Cl.
CPC ...... *G06F 11/0793* (2013.01); *G06F 11/0709* (2013.01); *G06F 11/1048* (2013.01)

(58) Field of Classification Search
CPC ............. G06F 11/0793; G06F 11/0709; G06F 11/1048; G06F 11/079; G06F 11/1024; G06F 11/142
See application file for complete search history.

(56) References Cited

U.S. PATENT DOCUMENTS

| | | | |
|---|---|---|---|
| 5,274,646 A | 12/1993 | Brey et al. |
| 7,328,365 B2 | 2/2008 | Karpuszka et al. |
| 7,694,169 B2 | 4/2010 | Slater et al. |
| 7,751,329 B2 | 7/2010 | Lapuh et al. |
| 8,204,061 B1 | 6/2012 | Sane et al. |
| 8,472,447 B2 | 6/2013 | Humphries |
| 8,484,529 B2 | 7/2013 | Alves et al. |
| 8,582,423 B2 | 11/2013 | Page et al. |
| 8,650,286 B1 | 2/2014 | Sajassi et al. |
| 8,713,387 B2 | 4/2014 | Johnson et al. |
| 8,775,858 B2 | 7/2014 | Gower et al. |
| 8,913,489 B2 | 12/2014 | Vinayagam et al. |
| 9,128,868 B2 | 9/2015 | Lastras-Montano et al. |
| 9,280,430 B2 | 3/2016 | Sarfare et al. |
| 9,459,951 B2 | 10/2016 | Fee et al. |
| 9,584,397 B2 | 2/2017 | Ghanwani et al. |
| 9,614,727 B2 | 4/2017 | Anumala et al. |
| 9,807,017 B2 | 10/2017 | Raman et al. |
| 10,558,519 B2 | 2/2020 | Gilda et al. |
| 2007/0234101 A1 | 10/2007 | Koktan et al. |

(Continued)

*Primary Examiner* — Katherine Lin

(57) ABSTRACT

An error message is received from a first computing node indicating a malfunction associated with the first computing node. Based on a first error code received in the error message, a first software program is determined that is to be installed at the first computing node to resolve the malfunction. A geographically nearest second computing node to the first computing node is determined that includes the first software program. The second computing node is instructed to transmit the first software program to the first computing node. The second computing node transmits the first software program to the first computing node. The first computing node receives and installs the first software program at the first computing node.

17 Claims, 2 Drawing Sheets

(56) References Cited

U.S. PATENT DOCUMENTS

| | | | |
|---|---|---|---|
| 2010/0293438 A1 | 11/2010 | Lastras-Montano et al. | |
| 2012/0230302 A1* | 9/2012 | Calcev | H04W 4/70 |
| | | | 370/336 |
| 2022/0417322 A1* | 12/2022 | Sanghvi | H04L 67/141 |

* cited by examiner

SYSTEM AND METHOD FOR MACHINE-TO-MACHINE RE-IMAGING

TECHNICAL FIELD

The present disclosure relates generally to network communication, and more specifically to a system and method for machine-to-machine re-imaging.

BACKGROUND

In some cases, an error may occur in the functioning of a computing node causing the computing node to malfunction or fail. Often a malfunction associated with a computing node is caused by one or more software programs installed and running at the computing node. In one example, a corrupted file associated with a software program may cause the malfunction. In another example, an older version of a software program that has not been updated at the computing node may cause the malfunction.

SUMMARY

The system and method implemented by the system as disclosed in the present disclosure provide technical solutions to the technical problems discussed above by intelligently detecting a malfunction associated with a computing node, identifying a software program that caused the malfunction, and re-installing or updating the software program to resolve the malfunction.

For example, the disclosed system and methods provide the practical application of detecting a malfunction associated with a computing node, determining a software program that needs to be installed or re-installed at the computing node to resolve the malfunction, identifying a nearest computing node that has the software program, and initiating transfer of program files associated with the software program from the nearest computing node to the malfunctioning computing node for installing or re-installing the software program at the malfunctioning computing node. As described in embodiments of the disclosure, the described system and method identify a computing node that has a lowest latency communication path to the malfunctioning computing node and command the computing node to transmit program files related to the software program over a peer-to-peer connection with the malfunctioning computing node. This reduces latency associated with resolving the malfunction and, in turn, reduces any downtime relating to the computing node caused by the malfunction. Further, reducing downtime relating to the computing node caused by the malfunction improves the performance of the computing node. In addition, having a nearest computing node transmit program files to the malfunctioning node saves network resources (e.g., network bandwidth) which would otherwise be used to transmit program files to the malfunctioning computing node from a faraway computing node.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
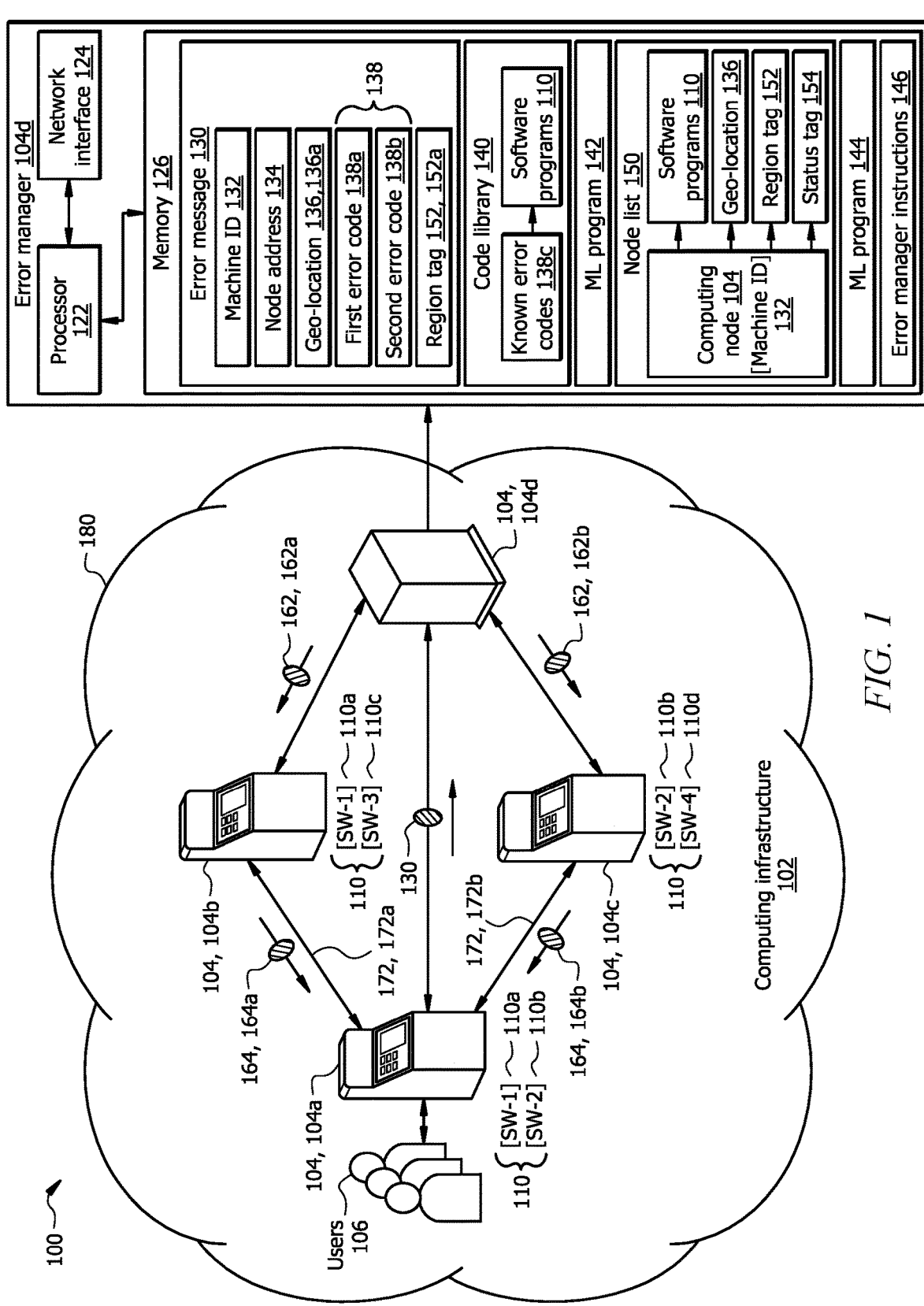
FIG. 1 is a schematic diagram of a system, in accordance with an embodiment of the present disclosure.

FIG. 1 is a schematic diagram of a system 100, in accordance with certain aspects of the present disclosure. As shown, system 100 includes a computing infrastructure 102 including a plurality of computing nodes 104 connected to a network 180. Computing infrastructure 102 may include a plurality of hardware and software components. The hardware components may include, but are not limited to, computing nodes 104 such as desktop computers, smartphones, tablet computers, laptop computers, servers and data centers, virtual reality (VR) headsets, augmented reality (AR) glasses and other hardware devices such as printers, routers, hubs, switches, input devices, output devices, and memory devices all connected to the network 180. In one example, embodiment, as shown in FIG. 1, the computing nodes 104 are automated teller machines (ATMs). The example system of FIG. 1 illustrates computing nodes 104a-104d (shown as ATMs) connected to the network 180. Software components may include software programs 110 that are run by one or more of the computing nodes 104 including, but not limited to, operating systems, user interface applications, web applications, third party software, database management software, service management software, metaverse software and other customized software programs implementing particular functionalities. For example, software code relating to one or more software programs 110 may be stored in a memory device and one or more processors may process the software code to implement respective functionalities. For example, an ATM may run several software programs 110 including an operating system, firmware associated with chipsets controlling various hardware devices and components of the ATM such as a card reader, a cash dispenser, a PIN pad, a receipt printer, sensors etc., and a customized software package including customized software tools and applications that implement customized functionalities for an entity that owns the ATM. As shown in FIG. 1, computing node 104a runs software programs 110a (shown as SW-1) and 110b (shown as SW-2). Computing node 104b runs software programs 110a (SW-1) and 110c (shown as SW-3). Computing node 104c runs software programs 110b (SW-2) and 110d (shown as SW-4).

In certain embodiments, one or more of the computing nodes 104 may be operated by a user 106. For example, a computing node 104 may provide a user interface (e.g., web UI and/or metaverse UI) using which a user 106 may operate the computing node 104 to perform data interactions within the computing infrastructure 102. For example, a user 106 may use a laptop computer to access a web application running on a server, wherein both the laptop computer and the server are part of the computing infrastructure 102. Similarly, a user 106 may use VR glasses to access a metaverse application running on a server, wherein both the VR glasses and the server are computing nodes 104 of the computing infrastructure 102. In another example, a user 106 may interact with a graphical user interface displayed by a display monitor associated with an ATM to perform one or more interactions.

In one embodiment, at least a portion of the computing infrastructure 102 may be representative of an Information Technology (IT) infrastructure of an organization/entity. In one example, the computing nodes (e.g., ATMs) 104a-104d connected to the network 180 may represent a private network owned and/or operated by a particular entity.

In one or more embodiments, one or more computing nodes 104 of the computing infrastructure 102 may be representative of a computing system that hosts software applications which may be installed and run locally or may be used to access software applications running on a server (not shown). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the computing nodes 104 may be representative of a server running one or more software applications to implement respective functionality (e.g., error manager 104*d*) as described below. In certain embodiments, one or more of the computing nodes 104 may run a thin client software application where the processing is directed by the thin client but largely performed by a central entity such as a server (not shown).

Network 180, in general, may be a wide area network (WAN), a personal area network (PAN), a cellular network, or any other technology that allows devices to communicate electronically with other devices. In one or more embodiments, network 180 may be the Internet.

In certain embodiments, at least a portion of the computing nodes 104 forms a blockchain network (not shown). For example, each of the computing nodes 104*a*, 104*b*, 104*c* and 104*d* may be part of a blockchain network. In additional or alternative embodiments, the computing nodes 104 (e.g., 104*a*-104*d*) are connected to the network 180 in a spine-leaf network architecture. A spine-leaf network architecture is a network topology that consists of two switching layers, a spine and a leaf. The leaf layer consists of access switches that aggregate traffic from servers (e.g., computing nodes 104) and connect directly into the spine or network core. Spine switches interconnect all leaf switches in a full-mesh topology. In one embodiment, the switches associated with the spine and the leaf layers are also connected to the blockchain network to which the computing nodes 104 are connected.

In some cases, an error may occur in the functioning of a computing node 104 causing the computing node 104 to malfunction or fail. An error associated with a computing node 104 may include a malfunction associated with one or more hardware components of the computing node 104, an error associated with the functioning of one or more software tools/programs (e.g., software programs 110) running at the computing node 104, or a combination thereof. For example, when a computing node 104 is an ATM, a hardware malfunction may include a malfunction associated with a card reader, a cash dispenser, a PIN pad, receipt printer, display monitor, sensors or other hardware components of the ATM. A software error associated with an ATM may include user interface (UI) errors such as unexpected or corrupted display of information on the display monitor or unresponsive touch buttons on the ATM UI. Often a malfunction associated with a computing node 104 is caused by one or more software programs 110 installed and running at the computing node 104. In one example, a corrupted file associated with a software program 110 may cause the malfunction. In another example, an older version of a software program 110 that has not been updated at the computing node 104 may cause the malfunction. In such a case, installing, re-installing and/or updating the software programs 110 causing the malfunction may resolve the malfunction. In some cases, the computing node 104 may need to be re-imaged which typically includes wiping all data from the hard drive and installing a fresh operating system and other software tools.

Embodiments of the present disclosure describe techniques to detect a malfunction associated with a computing node 104, determine one or more software programs 110 that need to be installed or re-installed at the computing node 104 to resolve the malfunction, identify one or more nearest computing nodes 104 that have the one or more software programs 110, and initiate transfer of program files associated with the one or more software programs 110 from the one or more nearest computing nodes 104 to the malfunctioning computing node 104 for installing or re-installing the one or more software programs 110 at the malfunctioning computing node 104. As further described below, the described techniques identify a computing node 104 that has a lowest latency communication path to the malfunctioning computing node 104 and command the computing node 104 to transmit program files related to the software program over a peer-to-peer connection with the malfunctioning computing node 104. This reduces latency associated with resolving the malfunction and, in turn, reduces any downtime relating to the computing node 104 caused by the malfunction.

One or more computing nodes 104 of the computing infrastructure 102 may implement an error manager 104*d* which, as further described below, is responsible for detecting and resolving an error/malfunction associated with computing nodes 104 connected to the network 180. For example, as shown in FIG. 1, error manager 104*d* is one of the computing nodes 104 that implements certain operations described in this disclosure relating to detecting, identifying and resolving errors associated with other computing nodes (e.g., 104*a*, 104*b* and 104*d*).

The error manager 104*d* comprises a processor 122, a memory 126, and a network interface 124. The error manager 104*d* may be configured as shown in FIG. 1 or in any other suitable configuration.

The processor 122 comprises one or more processors operably coupled to the memory 126. The processor 122 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 122 may be a programmable logic device, a microcontroller, a microprocessor, or any suitable combination of the preceding. The processor 122 is communicatively coupled to and in signal communication with the memory 126. The one or more processors are configured to process data and may be implemented in hardware or software. For example, the processor 122 may be 8-bit, 16-bit, 32-bit, 64-bit or of any other suitable architecture. The processor 122 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions, such as software instructions. For example, the one or more processors are configured to execute instructions (e.g., error manager instructions 146) to implement the error manager 104d. In this way, processor 122 may be a special-purpose computer designed to implement the functions disclosed herein. In one or more embodiments, the error manager 104d is implemented using logic units, FPGAs, ASICs, DSPs, or any other suitable hardware. The error manager 104d is configured to operate as described with reference to FIG. 2. For example, the processor 122 may be configured to perform at least a portion of the method 200 as described in FIG. 2.

The memory 126 comprises one or more non-transitory computer-readable mediums such as disks, tape drives, or solid-state drives, and may be used as an over-flow data storage device, to store programs when such programs are selected for execution, and to store instructions and data that are read during program execution. The memory 126 may be volatile or non-volatile and may comprise a read-only memory (ROM), random-access memory (RAM), ternary content-addressable memory (TCAM), dynamic random-access memory (DRAM), and static random-access memory (SRAM).

The memory 126 is operable to store an error message 130, code library 140, a machine learning (ML) models 142 and 144, a node list 150, and the error manager instructions 146. The error manager instructions 146 may include any suitable set of instructions, logic, rules, or code operable to execute the error manager 104d.

The network interface 124 is configured to enable wired and/or wireless communications. The network interface 124 is configured to communicate data between the error manager 104d and other devices, systems, or domains (e.g., computing nodes 104a-c etc.). For example, the network interface 124 may comprise a Wi-Fi interface, a LAN interface, a WAN interface, a modem, a switch, or a router. The processor 122 is configured to send and receive data using the network interface 124. The network interface 124 may be configured to use any suitable type of communication protocol as would be appreciated by one of ordinary skill in the art.

It may be noted that each of the other computing nodes 104 may be implemented like the error manager 104d shown in FIG. 1. For example, each of the computing nodes 104 may have a respective processor and a memory that stores data and instructions to perform operations discussed above.

A computing node 104 (e.g., 104a) may be configured to generate an error message 130 in response to detecting a malfunction at the computing node 104. For example, an ATM may generate an error message 130 in response to detecting that the cash dispenser has malfunctioned during an interaction performed by a user 106. It may be noted that embodiments of the present disclosure are described with reference to a malfunction associated with the computing node 104a. However, a person having ordinary skill in the art may appreciate that the embodiments apply to all computing nodes (illustrated or otherwise) connected to the network 180.

An error message 130 generated by the computing node 104a may include a machine ID 132 associated with the computing node 104a, a node address 134 of the computing node 104a, a geolocation 136a of the computing node 104a, and at least one error code 138. The machine ID 132 is a unique identifier assigned to the particular computing node 104a that uniquely identifies the computing node 104a in the network 180. Each computing node 104 (e.g., 104a-d) is assigned a unique machine ID 132. The node address 134 is the network address (e.g., Internet Protocol (IP) address) of the computing node 104a within the network 180. The geolocation 136a of the computing node 104a specifies the geographical location of the computing node 104a. In one example, the geolocation 136 may include global positioning system (GPS) coordinates which are usually expressed as a combination of latitude and longitude. An error code 138 may be representative of the nature of error/malfunction that occurred at the computing node 104a. For example, the computing node 104a may be configured with a list of known error codes 138c, wherein each known error code 138c is associated with a known malfunction associated with the computing node 104a. The computing node 104a is configured to identify a particular malfunction that occurred at the computing node 104a and assign a corresponding known error code 138c from the pre-configured list of known error codes 138c. The computing node 104a is configured to include the known error code 138c assigned to the malfunction in the error message 130. As shown in FIG. 1, error message 130 includes a first error code 138a and a second error code 138b, wherein each of the first error code 138a and the second error code 138b is a known error code 138c identified by the computing node 104a.

In certain embodiments, computing node 104a may be configured to identify multiple known error codes 138c and include these multiple known error codes 138c (shown as 138a and 138b) in the error message 130. In one embodiment, each of the multiple known error codes 138c (e.g., included as error codes 138a and 138b in the error message 130) corresponds to a different malfunction associated with the computing node 104a. For example, when a software program 110 that controls multiple hardware devices at an ATM is corrupted, the ATM may detect that the cash dispenser and the pin pad have failed at the same time. In such a case, the ATM may generate two different known error codes 138c corresponding to the two different malfunctioning devices. In an additional or alternative embodiment, multiple known error codes 138c may correspond to the same malfunction associated with the computing node 104a. For example, the malfunctioning cash dispenser at the ATM may cause a software exception at the ATM. In this case, the ATM may generate a known error code 138c corresponding to the failed cash dispenser and another known error code 138c corresponding to the software exception caused by the malfunctioning cash dispenser.

Computing node 104a may be configured to transmit the error message 130 to the error manager 104d. After receiving the error message 130 from the computing node 104a, the error manager 104d may be configured to determine one or more software programs 110 that need to be installed or re-installed at the computing node 104a to resolve the malfunction indicated by the one or more error codes (e.g., 138a, 138b) included in the error message 130. In this context, the error manager 104d may have access to a code library 140 that includes a list of known error codes 138c, wherein each known error code 138c in the code library 140 corresponds to a known error/malfunction associated with the computing node 104a. In one embodiment, the code library 140 includes a list known error codes 138c that correspond to errors/malfunction that are known to occur at a particular type of computing node 104. For example, the code library 140 includes a list known error codes 138c that correspond to errors/malfunction that are known to occur at ATMs. Each known error code 138c in the code library 140 is mapped to one or more software programs 110 that are known to cause a malfunction associated with the known error code 138c and that needs to be re-installed or updated at the computing node 104a to resolve the malfunction. For example, the code library 140 may include a list of known error codes 138c, wherein each known error code 138c is mapped to an identification (e.g., software name, version etc.) associated with a software program 110. In one example, a particular error code 138c associated with a malfunctioning cash dispenser at an ATM may be mapped to a particular software program 110 running at the ATM that is known to cause the identified malfunction associated with the cash dispenser and that needs to be re-installed or updated to resolve the malfunctioning cash dispenser.

To determine a software program 110 that needs to be installed, re-installed, or updated at the computing node 104a to resolve a malfunction, the error manager 104d may be configured to search the code library 140 for a known error code 138c that matches with the error code (e.g., 138a, 138b) received in the error message 130 from the computing node 104a. For example, assuming that the first error code 138a is included in the error message 130 received from the computing node 104a, the error manager 104d searches the code library 140 to find a known error code 138c that matches with the first error code 138c. In response to identifying a known error code 138c from the code library 140 that matches with the first error code 138a, the error manager 104d identifies the particular software program 110 that is mapped to the identified known error code 138c. For example, based on searching the code library 140, error manager 104d may determine that software program 110a (SW-1) is to be installed or updated at the computing node 104a.

In certain embodiments, the error manager 104d may identify multiple software programs 110 that are to be installed at the computing node 104a to resolve one or more malfunctions at the computing node 104a. In one embodiment, the error code (e.g., error code 138a) that was received in the error message 130 from the computing node 104a may match with a known error code 138c that maps to multiple software programs 110. This may mean that multiple software programs 110 are known to cause the known error code 138c. For example, based searching the code library 140, error manager 104d may determine that software program 110a (SW-1) as well as software program 110b (SW-2) are to be installed or updated at the computing node 104a. In an alternative or additional embodiment, the error manager 104d may identify multiple software programs 110 that need to be installed at the computing node 104a based on multiple error codes (e.g., 138a, 138b) included in the error message 130. For example, upon searching the code library 140 based on the first error code 138a, error manager 104d may identify a first known error code 138c that maps to software program 110a (SW-1). Further, upon searching the code library 140 based on the second error code 138b, error manager 104d may identify a second known error code 138b that maps to software program 110b (SW-2). In other words, the error manager 104d determines that both software programs 110a (SW-1) and 110b (SW-2) need to be installed or re-installed at the computing node 104a to resolve the malfunction. For example, 110a (SW-1) may be an operating system installed at an ATM, and 110b (SW-2) may be a customized software application allows users 106 to perform interactions with at the ATM. In this example, the error manager may determine that both the operating system and the customized software application are to be re-installed to resolve a malfunctioning cash dispenser at the ATM.

In one embodiment, error manager 104d may be configured to use a machine learning model 142 to identify one or more software programs 110. For example, error manager 104d may be configured to train the machine learning model 142 based on the code library 140 to identify software programs 110 based on candidate error codes 138 received in an error message 130. Error manager 104d may be configured to input an error code 138a to the trained machine learning model 142 to yield one or more software programs 110 that are to be installed, re-installed or updated at the malfunctioning computing node 104a.

In one embodiment, the error manager 104d may be configured to determine whether a software program 110 identified from the code library 140 is already installed at the computing node 104a and, if yes, what version of the software program 110 is installed at the computing node 104a. For example, error manager 104d may have access to information regarding software programs 110 installed and running at computing nodes 104 connected to the network 180. For example, a centralized repository or a decentralized repository may store most recent information relating to software programs 110 installed at the computing nodes 104. The repository may identity the software programs 110 (e.g., including the versions of the software programs) installed at particular computing nodes by the unique machine IDs 132 associated with the computing nodes 104. In one embodiment, based on the machine ID 132 of the computing node 104a included in the error message 130, the error manager 104d may identify (e.g., from the repository) the software programs 110 installed at the computing node 104a. For example, error manager 104d may identify that software programs 110a and 110b are installed at the computing node 104a. In addition, error manager 104d may identify the particular versions of the software programs 110a and 110b that are installed at the computing node 104a.

In one or more embodiments, after identifying a software program 110 (e.g., 110a) from the code library 140 that caused the malfunction, at least in part, at the computing node 104a, error manager 104d may be configured to determine whether the identified software program 110a is to be re-installed or updated. For example, if the latest version of the identified software program 110a is already installed at the computing node 104a, the error manager 104d determines that the entire software program 110a is to be re-installed with the same version of the software program 110a. On the other hand, if an older version of the identified software program 110a is installed at the computing node 104a, the error manager 104d may determine that the software program 110a is to be updated, which may mean that an updated version of the software program 110a is to be installed at the computing node 104a or a software patch is installed to update the software program 110a. In alternative embodiments, regardless of what version of the software program 110a installed at the computing node 104a, error manager 104d determines that the software program 110a is to be deleted and re-installed with the latest version of the software program 110a. In another alternative embodiment, error manager 104d determines that the computing node 104 is to be re-imaged which typically includes wiping all data from the hard drive of the computing node 104a and installing a fresh operating system and other software programs including software programs 110a and 110b. For example, when one of the software programs 110 that is to be re-installed is the operating system installed at the computing node 104a, the error manager 104d determines to re-image the computing node 104.

In any case, a result of the above process is an identification of one or more software programs 110 (including the particular versions of the software programs 110) that are to be installed at the computing node 104a.

After identifying a software program 110a from the code library 140, error manager 104d may be configured to determine a geographically nearest computing node 104 (e.g., 104b) (to the malfunctioning computing node 104a) that has the software program 110a installed on site. In this context, the error manager 104d may have access to a node list 150 that includes a list of machine IDs 132 of computing nodes 104, wherein each machine ID 132 is mapped at least to an identifier associated with each software program 110 (including the version of the software program 110) installed at the respective computing node 104 and a geolocation 136 of the computing node 104. In other words, for each computing node 104 connected to the network 180, the node list 150 includes information about the software programs 110 installed at the computing node 104 and the geographical location of the computing node 104. To determine the nearest computing node 104, to the malfunctioning computing node 104a, that has a software program 110a identified from the code library 140, the error manager 104d searches the node list 150 based on the identified software program 110a and the geolocation 136a of the malfunction computing node 104a received in the error message 130. Based on searching the node list 150, error manager 104d determines a computing node 104 that has the software program 110a installed on site and is geographically nearest to the malfunctioning computing node 104a. For example, if the error manager 104d identifies two computing nodes 104 from the node list 150 that have the software program 110a installed on site, the error manager 104d chooses one of the two computing nodes 104 that is geographically nearer to the computing node 104a. Essentially, the error manager 104d identifies a computing node 104 that has a lowest latency communication path to the malfunctioning computing node 104a and has the needed software program 110a. The assumption here is that that a computing node 104 that is geographically nearest to the malfunctioning computing node 104a most likely has the lowest latency communication path to the malfunctioning computing node 104a. In one example, based on searching the node list 150, error manager 104d determines that computing node 104b is the nearest computing node 104 that has the software program 110a.

In one embodiment, error manager 104d may be configured to determine a nearest computing node 104b (e.g., to the malfunctioning computing node 104a) that is located within a same geographical region 152 as the computing node 104a and that further has the software program 110a. In this context, the network of computing nodes 104 may be divided into several regions 152, wherein a computing node 104 located in a particular region 152 services users 106 within the particular region 152. For example, ATMs connected to the network 180 may be located all across a country. These ATMs may be grouped by regions within the country, for example, by state, by county, by city etc. In one embodiment, the error message 130 received by the error manager 104d from the malfunctioning computing node 104a further includes an indication of the geographical region (e.g., shown as region tag 152a) in which the computing node 104a is located. Further, each computing node 104 in the node list 150 is also associated with an indication of the geographical region (shown as region tag 152) within which the computing node 104 is located. A geographical region 153 associated with a computing node 104 may include a city, town, state, county, or any or regional classification assigned to the computing nodes 104. To determine a nearest computing node 104b (e.g., to the malfunctioning computing node 104a) that is located within a same geographical region 152 as the computing node 104a and that further has the software program 110a, error manager 104d searches from only those computing nodes 104 in the node list 150 that are located in the same geographical region 152 as the malfunctioning computing node. For example, error manager 104d searches from only those computing nodes 104 in the node list 150 whose region tags 152 matches with the corresponding region tag 152a received in the error message 130. The idea here is that computing nodes 104 that are located in the same region as the malfunctioning computing node 104a are highly likely to have the same software programs 110 installed as the malfunctioning computing node 104a. For example, all ATMs in a particular region 152 may have a customized software package that services unique needs of the region. For example, a customized software program 110a may be configured to display local advertisements that are directed to users 106 living within the region where the ATM is located. Additionally, the nearest computing node 104 to the malfunctioning computing node 104a is most likely located within the same region 152 as the malfunctioning computing node 104a. Searching from only those computing nodes 104 in the node list 150 that are located within the same region 152 as the malfunctioning computing node 104a saves computing resources (e.g., processing and memory resources) at the error manager 104d as the error manager 104d does not need to search the entire node list 150. This improves the processing efficiency associated with the error manager 104d.

In an additional or alternative embodiment, error manager 104d may be configured to determine a nearest active computing node 104b (e.g., to the malfunctioning computing node 104a) that has the software program 110a identified from the code library 140. An active computing node 104b is a computing node 104 that is operating normally. On the other hand, an inactive computing node 104 is a computing node 104 that is not operational (e.g., has malfunctioned). In one embodiment, each computing node 104 in the node list 150 is associated with a status tag 154 that indicates whether the computing node 104 is active or inactive. Error manager 104d may be configured to search from only those computing nodes 104 from the node list 150 whose associated status tag 154 indicates an active status. In other words, error manager 104d searches form only those computing nodes 104 that are active/operational. The idea here is that inactive computing nodes 104 may be unable to transmit or receive data. Thus, determining an inactive computing node 104 from the node list 150 may waste processing resources used to search the node list 150 for the inactive computing node 104, and further wastes network bandwidth attempting to communicate with the inactive computing node 104. Thus, searching from only active computing nodes 104 form the node list saves processing resources and network bandwidth.

Thus, in one embodiment, based on searching the node list 150, the error manager 104d determines a nearest active computing node 104b (to the malfunctioning computing node 104a) located in the same region as the computing node 104a and has the software program 110a identified from the code library 140.

Error manager 104d may use a machine learning model 144 to determine a geographically nearest computing node 104 (e.g., 104b) to the malfunctioning computing node 104a that has the needed software program 110a. Error manager 104d may be configured to train the machine learning model 144 based on the node list 150 to determine a nearest computing node 104 to malfunctioning computing node 104a that has a needed software program 110 installed. To determine the nearest computing node 104 that has a needed software program 110a, the error manager 104d may input the identity of the software program 110a (including the particular version of the software program 110a) and the geolocation 136a of the malfunctioning computing node 104a (and other parameters such as the region 152a) to the trained machine learning model 144. In response, the machine learning model 144 may output an identity (e.g., machine ID and/or node address etc.) of the nearest computing node 104b that has the software program 110a installed at the computing node 104b.

It may be noted that error manager 104d may follow the process described above to determine a computing node 104 for each software program 110 identified from the code library 140. As noted above, based on one or more error codes (e.g., 138a, 138b) received in the error message 130, error manager 104d may identify multiple software programs (e.g., 110a, 110b) that need to be installed or re-installed at the malfunctioning computing node 104a. For example, based on the first error code 138a and the second error code 138b received in the error message 130, error manager 104d may identify a first software program 110a and a second software program 110b respectively that need to be installed or re-installed at the malfunctioning computing node 104a. Using the process described above, error manager 104d may determine a first nearest computing node 104b that has the first software program 110a installed onsite at the computing node 104b and a second nearest computing node 104c that has the second software program 110b installed onsite at the computing node 104c.

After determining a nearest computing node 104 (to the malfunctioning computing node 104a) that has a software program 110 identified from the code library 140, error manager 104d transmits a command 162 to the computing node 104, wherein the command 162 instructs the computing node 104 to transmit one or more program files 164 associated with software program 110 to the malfunctioning computing node 104a. The one or more program files 164 associated with the software program 110 may include an executable file that can be used to install or re-install the software program 110 at the malfunctioning computing node 104a. In one embodiment, the command 162 further includes an instruction to transmit the program files 164 to the malfunctioning computing node 104a over a peer-to-peer connection 172 with the malfunctioning computing node 104a. The idea here is that a peer-to-peer connection 172 provides a lowest latency communication path between two computing nodes 104. Thus, transmitting the program files 164 to the malfunctioning computing node 104a over a peer-to-peer connection most likely is the fastest method to get the needed software program 110 to the malfunctioning computing node 104a. This generally results in a faster install or re-install of the software program 110a at the malfunctioning computing node 104a causing a faster recovery of the malfunctioning computing node 104a, thus reducing any downtime associated with the malfunctioning computing node 104a.

The command 162 may further include the machine ID 132 of the malfunctioning computing node 104a, the node address 134 of the malfunctioning computing node 104a, and a program ID that identifies the software program 110 (e.g., including the specific version of the software program 110) that is to be transmitted to the malfunctioning computing node 104a. For example, upon identifying that the computing node 104b is the nearest computing node 104, to the malfunctioning computing node 104a, that has the software program 110a, error manager 104d transmits a command 162a to the computing node 104b, wherein the command 162a instructs the computing node 104b to transmit one or more program files 164a associated with the software program 110a to the malfunctioning computing node 104a. In another example, upon identifying that the computing node 104c is the nearest computing node 104, to the malfunctioning computing node 104a, that has the software program 110b, error manager 104d transmits a command 162b to the computing node 104c, wherein the command 162b instructs the computing node 104c to transmit one or more program files 164b associated with the software program 110b to the malfunctioning computing node 104a. In one embodiment, when the error manager 104d determines that both software programs 110a and 110b are to be installed or re-installed at the malfunctioning computing node 104a, error manager 104d transmits commands 162a and 162b to the respective computing nodes 104b and 104c.

Upon receiving a command 162 (e.g., 162a, 162b) from the error manager 104d, the receiving computing node 104 (e.g., 104b, 104c) extracts from the command 162, the machine ID 132 associated with the malfunctioning computing node 104a, the node address 134 associated with the malfunctioning computing node 104a, and the program ID of the software program 110 (e.g., 110a, 110b) that is to be transmitted to the malfunctioning computing node 104a. The computing node 104 (e.g., 104b, 104c) may establish a peer-to-peer connection 172 with the malfunctioning computing node 104a. For example, as shown in FIG. 1, computing node 104b establishes a peer-to-peer connection 172a with the malfunctioning computing node 104a. In another example, computing node 104c establishes a peer-to-peer connection 172b with the malfunctioning computing node 104a. The computing node 104 (e.g., 104b, 104c) may be configured to transmit the respective program files (e.g., 164a, 164b) identified by the program ID to the malfunctioning computing node 104a at the node address 134 of the malfunctioning computing node 104a. In one embodiment, the computing node 104 (e.g., 104b, 104c) may use the inter planetary file system (IPFS) protocol to establish peer-to-peer connections 172a, 172b with the malfunctioning computing node 104a and transmit the respective program files 164a, 164b to the malfunctioning computing node 104a.

Upon receiving the program files (e.g., 164a, 164b), the malfunctioning computing node 104a may be configured to install or re-install the respective software program (e.g., 110a, 110b) at the malfunctioning computing node 104a. This may resolve the malfunction associated with the malfunctioning computing node 104a.

Figure 2:
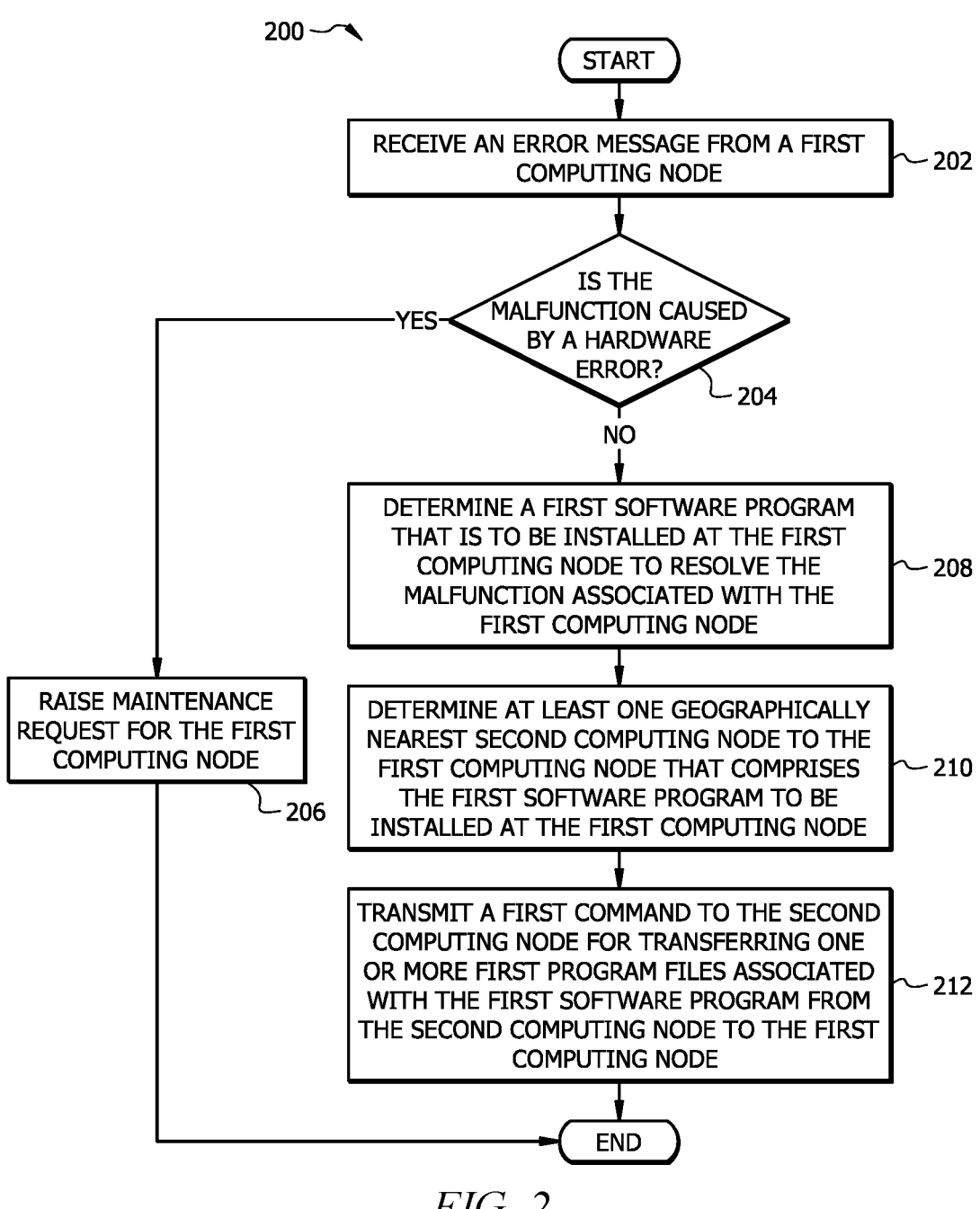
FIG. 2 illustrates a flowchart of an example method for resolving a malfunction at a computing node, in accordance with an embodiment of the present disclosure.

FIG. 2 illustrates a flowchart of an example method 200 for resolving a malfunction at a computing node (e.g., computing node 104a), in accordance with an embodiment of the present disclosure. Method 200 may be performed by the error manager 104d shown in FIG. 1.

At operation 202, error manager 104d receives an error message 130 from a first computing node (e.g., computing node 104a), wherein the error message 130 indicates a malfunction associated with the first computing node.

As described above, a computing node 104 (e.g., 104a) may be configured to generate an error message 130 in response to detecting a malfunction at the computing node 104. For example, an ATM may generate an error message 130 in response to detecting that the cash dispenser has malfunctioned during an interaction performed by a user 106. An error message 130 generated by the computing node 104a may include a machine ID 132 associated with the computing node 104a, a node address 134 of the computing node 104a, a geolocation 136 (e.g., 136a) of the computing node 104a, and at least one error code 138. The machine ID 132 is a unique identifier assigned to the particular computing node 104a that uniquely identifies the computing node 104a in the network 180. Each computing node 104 (e.g., 104a-d) is assigned a unique machine ID 132. The node address 134 is the network address (e.g., Internet Protocol (IP) address) of the computing node 104a within the network 180. The geolocation 136a of the computing node 104a specifies the geographical location of the computing node 104a. In one example, the geolocation 136 may include global positioning system (GPS) coordinates which are usually expressed as a combination of a latitude and a longitude. An error code 138 may be representative of the nature of error/malfunction that occurred at the computing node 104a. For example, the computing node 104a may be configured with a list of known error codes 138c, wherein each known error code 138c is associated with a known malfunction associated with the computing node 104a. The computing node 104a is configured to identify a particular malfunction that occurred at the computing node 104a and assign a corresponding known error code 138c from the pre-configured list of known error codes 138c. The computing node 104a is configured to include the known error code 138c assigned to the malfunction in the error message 130. As shown in FIG. 1, error message 130 includes a first error code 138a and a second error code 138b, wherein each of the first error code 138a and the second error code 138b is a known error code 138c identified by the computing node 104a.

In certain embodiments, computing node 104a may be configured to identify multiple known error codes 138c and include these multiple known error codes 138c (shown as 138a and 138b) in the error message 130. In one embodiment, each of the multiple known error codes 138c (e.g., included as error codes 138a and 138b in the error message 130) corresponds to a different malfunction associated with the computing node 104a. For example, when a software program 110 that controls multiple hardware devices at an ATM is corrupted, the ATM may detect that the cash dispenser and the pin pad have failed at the same time. In such a case, the ATM may generate two different known error codes 138c corresponding to the two different malfunctioning devices. In an additional or alternative embodiment, multiple known error codes 138c may correspond to the same malfunction associated with the computing node 104a. For example, the malfunctioning cash dispenser at the ATM may cause a software exception at the ATM. In this case, the ATM may generate a known error code 138c corresponding to the failed cash dispenser and another known error code 138c corresponding to the software exception caused by the malfunctioning cash dispenser. Computing node 104a may be configured to transmit the error message 130 to the error manager 104d.

At operation 204, error manager 104d determines whether the malfunction at the first computing node (e.g., computing node 104a) is caused by a hardware error. For example, error manager 104d examines the one or more error codes 138 received in the error message 130 to determine whether the malfunction is caused by a hardware error (e.g., failed hardware device component) or a software error (e.g., a failed software program 110). In response to detecting that the malfunction at the computing node 104a was caused by a hardware error, method 200 proceeds to operation 206 where the error manager 104d raises a maintenance request to send a service technician to the site of the first computing node. On the other hand, in response to detecting that the malfunction at the computing node 104a was not caused by a software error, method 200 proceeds to operation 208. In one embodiment, operation 204 is optional, in which case method 200 proceeds from operation 202 directly to operation 208.

At operation 208, error manager 104d determines a first software program (e.g., software program 110a) that is to be installed at the first computing node (e.g., computing node 104a) to resolve the malfunction associated with the first computing node.

As described above, after receiving the error message 130 from the computing node 104a, the error manager 104d may be configured to determine one or more software programs 110 that need to be installed or re-installed at the computing node 104a to resolve the malfunction indicated by the one or more error codes (e.g., 138a, 138b) included in the error message 130. In this context, the error manager 104d may have access to a code library 140 that includes a list of known error codes 138c, wherein each known error code 138c in the code library 140 corresponds to a known error/malfunction associated with the computing node 104a. In one embodiment, the code library 140 includes a list known error codes 138c that correspond to errors/malfunction that are known to occur at a particular type of computing node 104. For example, the code library 140 includes a list known error codes 138c that correspond to errors/malfunction that are known to occur at ATMs. Each known error code 138c in the code library 140 is mapped to one or more software programs 110 that are known to cause a malfunction associated with the known error code 138c and that needs to be re-installed or updated at the computing node 104a to resolve the malfunction. For example, the code library 140 may include a list of known error codes 138c, wherein each known error code 138c is mapped to an identification (e.g., software name, version etc.) associated with a software program 110. In one example, a particular error code 138c associated with a malfunctioning cash dispenser at an ATM may be mapped to a particular software program 110 running at the ATM that is known to cause the identified malfunction associated with the cash dispenser and that needs to be re-installed or updated to resolve the malfunctioning cash dispenser.

To determine a software program 110 that needs to be installed, re-installed, or updated at the computing node 104a to resolve a malfunction, the error manager 104d may be configured to search the code library 140 for a known error code 138c that matches with the error code (e.g., 138a, 138b) received in the error message 130 from the computing node 104a. For example, assuming that the first error code 138a is included in the error message 130 received from the computing node 104a, the error manager 104d searches the code library 140 to find a known error code 138c that matches with the first error code 138c. In response to identifying a known error code 138c from the code library 140 that matches with the first error code 138a, the error manager 104d identifies the particular software program 110 that is mapped to the identified known error code 138c. For example, based on searching the code library 140, error manager 104d may determine that software program 110a (SW-1) is to be installed or updated at the computing node 104a.

In certain embodiments, the error manager 104d may identify multiple software programs 110 that are to be installed at the computing node 104a to resolve one or more malfunctions at the computing node 104a. In one embodiment, the error code (e.g., error code 138a) that was received in the error message 130 from the computing node 104a may match with a known error code 138c that maps to multiple software programs 110. This may mean that multiple software programs 110 are known to cause the known error code 138*c*. For example, based on searching the code library 140, error manager 104*d* may determine that software program 110*a* (SW-1) as well as software program 110*b* (SW-2) are to be installed or updated at the computing node 104*a*. In an alternative or additional embodiment, the error manager 104*d* may identify multiple software programs 110 that need to be installed at the computing node 104*a* based on multiple error codes (e.g., 138*a*, 138*b*) included in the error message 130. For example, upon searching the code library 140 based on the first error code 138*a*, error manager 104*d* may identify a first known error code 138*c* that maps to software program 110*a* (SW-1). Further, upon searching the code library 140 based on the second error code 138*b*, error manager 104*d* may identify a second known error code 138*b* that maps to software program 110*b* (SW-2). In other words, the error manager 104*d* determines that both software programs 110*a* (SW-1) and 110*b* (SW-2) need to be installed or re-installed at the computing node 104*a* to resolve the malfunction. For example, 110*a* (SW-1) may be an operating system installed at an ATM, and 110*b* (SW-2) may be a customized software application that allows users 106 to perform interactions with at the ATM. In this example, the error manager 104*d* may determine that both the operating system and the customized software application are to be re-installed to resolve a malfunctioning cash dispenser at the ATM.

In one embodiment, error manager 104*d* may be configured to use a machine learning model 142 to identify one or more software programs 110. For example, error manager 104*d* may be configured to train the machine learning model 142 based on the code library 140 to identify software programs 110 based on error codes 138 received in an error message 130. Error manager 104*d* may be configured to input an error code 138*a* to the trained machine learning model 142 to yield one or more software programs 110 that are to be installed, re-installed or updated at the malfunctioning computing node 104*a*.

In any case, a result of the above process is an identification (e.g., program ID) of one or more software programs 110 (including the particular versions of the software programs 110) that are to be installed at the computing node 104*a*.

At operation 210, error manager 104*d* determines at least one geographically nearest second computing node (e.g., computing node 104*b*) to the first computing node (e.g., computing node 104*a*) that comprises the first software program (e.g., software program 110*a*) to be installed at the first computing node.

As described above, after identifying a software program 110*a* from the code library 140, error manager 104*d* may be configured to determine a geographically nearest computing node 104 (e.g., 104*b*) (to the malfunctioning computing node 104*a*) that has the software program 110*a* installed on site. In this context, the error manager 104*d* may have access to a node list 150 that includes a list of machine IDs 132 of computing nodes 104, wherein each machine ID 132 is mapped at least to an identifier associated with each software program 110 (including the version of the software program 110) installed at the respective computing node 104 and a geolocation 136 of the computing node 104. In other words, for each computing node 104 connected to the network 180, the node list 150 includes information about the software programs 110 installed at the computing node 104 and the geographical location of the computing node 104. To determine the nearest computing node 104, to the malfunctioning computing node 104*a*, that has a software program 110*a* identified from the code library 140, the error manager 104*d* searches the node list 150 based on the identified software program 110*a* and the geolocation 136*a* of the malfunction computing node 104*a* received in the error message 130. Based on searching the node list 150, error manager 104*d* determines a computing node 104*b* that has the software program 110*a* installed on site and is geographically nearest to the malfunctioning computing node 104*a*. For example, if the error manager 104*d* identifies two computing nodes 104 from the node list 150 that have the software program 110*a* installed on site, the error manager 104*d* chooses one of the two computing nodes 104 that is geographically nearer to the computing node 104*a*. Essentially, the error manager 104*d* identifies a computing node 104*b* that has a lowest latency communication path to the malfunctioning computing node 104*a* and has the needed software program 110*a*. The assumption here is that that a computing node 104 that is geographically nearest to the malfunctioning computing node 104*a* most likely has the lowest latency communication path to the malfunctioning computing node 104*a*. In one example, based on searching the node list 150, error manager 104*d* determines that computing node 104*b* is the nearest computing node 104 that has the software program 110*a*.

In one embodiment, error manager 104*d* may be configured to determine a nearest computing node 104*b* (e.g., to the malfunctioning computing node 104*a*) that is located within a same geographical region 152 as the computing node 104*a* and that further has the software program 110*a*. In this context, the network of computing nodes 104 may be divided into several regions 152, wherein a computing node 104 located in a particular region 152 services users 106 within the particular region 152. For example, ATMs connected to the network 180 may be located all over a country. These ATMs may be grouped by regions within the country, for example, by state, by county, by city etc. In one embodiment, the error message 130 received by the error manager 104*d* from the malfunctioning computing node 104*a* further includes an indication of the geographical region (e.g., shown as region tag 152*a*) in which the computing node 104*a* is located. Further, each computing node 104 in the node list 150 is also associated with an indication of the geographical region (shown as region tag 152) within which the computing node 104 is located. A geographical region 152 associated with a computing node 104 may include a city, town, state, county, or any or regional classification assigned to the computing nodes 104. To determine a nearest computing node 104*b* (e.g., to the malfunctioning computing node 104*a*) that is located within a same geographical region 152 as the computing node 104*a* and that further has the software program 110*a*, error manager 104*d* searches from only those computing nodes 104 in the node list 150 that are located in the same geographical region 152 as the malfunctioning computing node 104*a*. For example, error manager 104*d* searches from only those computing nodes 104 in the node list 150 whose region tags 152 matches with the corresponding region tag 152*a* received in the error message 130. The idea here is that computing nodes 104 that are located in the same region as the malfunctioning computing node 104*a* are likely to have the same software programs 110 installed as the malfunctioning computing node 104*a*. For example, all ATMs in a particular region 152 may have a customized software package that services unique needs of the region. For example, a customized software program 110*a* may be configured to display local advertisements that are directed to users 106 living within the region where the ATM is located. Additionally, the nearest computing node 104 to the malfunctioning computing node 104a is most likely located within the same region 152 as the malfunctioning computing node 104a. Searching from only those computing nodes 104 in the node list 150 that are located within the same region 152 as the malfunctioning computing node 104a saves computing resources (e.g., processing and memory resources) at the error manager 104d as the error manager 104d does not need to search the entire node list 150. This improves the processing efficiency associated with the error manager 104d.

In an additional or alternative embodiment, error manager 104d may be configured to determine a nearest active computing node 104b (e.g., to the malfunctioning computing node 104a) that has the software program 110a identified from the code library 140. An active computing node 104b is a computing node 104 that is operating normally. On the other hand, an inactive computing node 104 is a computing node 104 that is not operational (e.g., has malfunctioned). In one embodiment, each computing node 104 in the node list 150 is associated with a status tag 154 that indicates whether the computing node 104 is active or inactive. Error manager 104d may be configured to search from only those computing nodes 104 from the node list 150 whose associated status tag 154 indicates an active status. In other words, error manager 104d searches form only those computing nodes 104 that are active/operational. The idea here is that inactive computing nodes 104 may be unable to transmit or receive data. Thus, determining an inactive computing node 104 from the node list 150 may waste processing resources used to search the node list 150 for the inactive computing node 104, and further wastes network bandwidth attempting to communicate with the inactive computing node 104. Thus, searching from only active computing nodes 104 form the node list saves processing resources and network bandwidth.

Thus, in one embodiment, based on searching the node list 150, the error manager 104d determines a nearest active computing node 104b (to the malfunctioning computing node 104a) located in the same region as the computing node 104a and has the software program 110a identified from the code library 140.

Error manager 104d may use a machine learning model 144 to determine a geographically nearest computing node 104 (e.g., 104b) to the malfunctioning computing node 104a that has the needed software program 110a. Error manager 104d may be configured to train the machine learning model 144 based on the node list 150 to determine a nearest computing node 104 to malfunctioning computing node 104a that has a needed software program 110 installed. To determine the nearest computing node 104 that has a needed software program 110a, the error manager 104d may input the identity of the software program 110a (including the particular version of the software program 110a) and the geolocation 136a of the malfunctioning computing node 104a (and other parameters such as the region 152a) to the trained machine learning model 144. In response, the machine learning model 144 may output an identity (e.g., machine ID and/or node address etc.) of the nearest computing node 104b that has the software program 110a installed at the computing node 104b.

It may be noted that error manager 104d may follow the process described above to determine a computing node 104 for each software program 110 identified from the code library 140. As noted above, based on one or more error codes (e.g., 138a, 138b) received in the error message 130, error manager 104d may identify multiple software programs (e.g., 110a, 110b) that need to be installed or re-installed at the malfunctioning computing node 104a. For example, based on the first error code 138a and the second error code 138b received in the error message 130, error manager 104d may identify a first software program 110a and a second software program 110b respectively that need to be installed or re-installed at the malfunctioning computing node 104a. Using the process described above, error manager 104d may determine a first nearest computing node 104b that has the first software program 110a installed onsite at the computing node 104b and a second nearest computing node 104c that has the second software program 110b installed onsite at the computing node 104c.

At operation 212, error manager 104d transmits a first command (e.g., command 162a) to the second computing node (e.g., 104b) for transferring one or more first program files (e.g., program files 164a) associated with the first software program (e.g., software program 110a) from the second computing node to the first computing node (e.g., computing node 104a).

As described above, after determining a nearest computing node 104 (to the malfunctioning computing node 104a) that has a software program 110 identified from the code library 140, error manager 104d transmits a command 162 to the computing node 104, wherein the command 162 instructs the computing node 104 to transmit one or more program files 164 associated with software program 110 to the malfunctioning computing node 104a. The one or more program files 164 associated with the software program 110 may include an executable file that can be used to install or re-install the software program 110 at the malfunctioning computing node 104a. In one embodiment, the command 162 further includes an instruction to transmit the program files 164 to the malfunctioning computing node 104a over a peer-to-peer connection 172 with the malfunctioning computing node 104a. The idea here is that a peer-to-peer connection 172 provides a lowest latency communication path between two computing nodes 104. Thus, transmitting the program files 164 to the malfunctioning computing node 104a over a peer-to-peer connection most likely is the fastest method to get the needed software program 110 to the malfunctioning computing node 104a. This generally results in a faster install or re-install of the software program 110a at the malfunctioning computing node 104a causing a faster recovery of the malfunctioning computing node 104a, thus reducing any downtime associated with the malfunctioning computing node 104a.

The command 162 may further include the machine ID 132 of the malfunctioning computing node 104a, the node address 134 of the malfunctioning computing node 104a, and a program ID that identifies the software program 110 (e.g., including the specific version of the software program 110) that is to be transmitted to the malfunctioning computing node 104a. For example, upon identifying that the computing node 104b is the nearest computing node 104, to the malfunctioning computing node 104a, that has the software program 110a, error manager 104d transmits a command 162a to the computing node 104b, wherein the command 162a instructs the computing node 104b to transmit one or more program files 164a associated with the software program 110a to the malfunctioning computing node 104a. In another example, upon identifying that the computing node 104c is the nearest computing node 104, to the malfunctioning computing node 104a, that has the software program 110b, error manager 104d transmits a command 162b to the computing node 104c, wherein the command 162b instructs the computing node 104c to transmit one or more program files 164b associated with the software program 110b to the malfunctioning computing node 104*a*. In one embodiment, when the error manager 104*d* determines that both software programs 110*a* and 110*b* are to be installed or re-installed at the malfunctioning computing node 104*a*, error manager 104*d* transmits commands 162*a* and 162*b* to the respective computing nodes 104*b* and 104*c*.

Upon receiving a command 162 (e.g., 162*a*, 162*b*) from the error manager 104*d*, the receiving computing node 104 (e.g., 104*b*, 104*c*) extracts from the command 162, the machine ID 132 associated with the malfunctioning computing node 104*a*, the node address 134 associated with the malfunctioning computing node 104*a*, and the program ID of the software program 110 (e.g., 110*a*, 110*b*) that is to be transmitted to the malfunctioning computing node 104*a*. The computing node 104 (e.g., 104*b*, 104*c*) may establish a peer-to-peer connection 172 with the malfunctioning computing node 104*a*. For example, as shown in FIG. 1, computing node 104*b* establishes a peer-to-peer connection 172*a* with the malfunctioning computing node 104*a*. In another example, computing node 104*c* establishes a peer-to-peer connection 172*b* with the malfunctioning computing node 104*a*. The computing node 104 (e.g., 104*b*, 104*c*) may be configured to transmit the respective program files (e.g., 164*a*, 164*b*) identified by the program ID to the malfunctioning computing node 104*a* at the node address 134 of the malfunctioning computing node 104*a*. In one embodiment, the computing node 104 (e.g., 104*b*, 104*c*) may use the inter planetary file system (IPFS) protocol to establish peer-to-peer connections 172*a*, 172*b* with the malfunctioning computing node 104*a* and transmit the respective program files 164*a*, 164*b* to the malfunctioning computing node 104*a*.

Upon receiving the program files (e.g., 164*a*, 164*b*), the malfunctioning computing node 104*a* may be configured to install or re-install the respective software program (e.g., 110*a*, 110*b*) at the malfunctioning computing node 104*a*. This may resolve the malfunction associated with the malfunctioning computing node 104*a*.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a plurality of computing nodes connected to a network; and
a processor communicatively coupled to the plurality of computing nodes and configured to:
receive an error message from a first computing node of the plurality of computing nodes, wherein the error message indicates a malfunction associated with the first computing node and comprises a first machine identity (ID) associated with the first computing node, a node address associated with the first computing node, a geolocation associated with the first computing node, and a first error code generated by the first computing node relating to the malfunction;
train a machine learning model based on a library of known error codes to determine one or more software programs based on a candidate error code;
input the first error code to the trained machine learning model to determine a first software program that is to be installed at the first computing node to resolve the malfunction associated with the first computing node;
determine, based at least on the determined first software program that is to be installed at the first computing node and the geolocation associated with the first computing node, at least one geographically nearest second computing node to the first computing node that comprises the first software program to be installed at the first computing node; and
transmit a first command to the second computing node to transfer one or more first program files associated with the first software program from the second computing node to the first computing node, wherein the first command at least comprises the first machine ID associated with the first computing node, a first program ID associated with the first software program, and the node address associated with the first computing node;
wherein:
the second computing node transmits the one or more first program files to the first computing node at the node address associated with the first computing node; and
the first computing node receives the one or more first program files from the second computing node and installs the first software program using the one or more first program files.

2. The system of claim 1, wherein the processor is further configured to determine the first software program that is to be installed at the first computing node by:
searching a library of known error codes based on the first error code received in the error message, wherein:
the library of known error codes comprises a plurality of known error codes;
each known error code from the library is mapped to a software program that is known to cause a malfunction associated with the known error code and that is to be re-installed or updated at a respective computing node to resolve the malfunction;
determining, based on the searching, a known error code from the library that matches with the first error code received in the error message; and
determining that the first software program is mapped to the error code.

3. The system of claim 1, wherein:

the error message further comprises a second error code generated by the first computing node relating to the malfunction associated with the first computing node;

the processor is further configured to:

determine, based on the second error code, a second software program that is to be installed at the first computing node to resolve the malfunction associated with the first computing node;

determine, based at least on the determined second software program that is to be installed at the first computing node and the geolocation associated with the first computing node received in the error message, at least one geographically nearest third computing node to the first computing node that comprises the second software program to be installed at the first computing node; and transmit a second command to the third computing node for transferring one or more second program files to the first computing node over a peer-to-peer connection between the third computing node and the first computing node, wherein the second command at least comprises the first machine ID associated with the first computing node, a second program ID associated with the second software program, and the node address associated with the first computing node;

wherein:

the third computing node transmits the one or more second program files to the first computing node at the node address associated with the first computing node over the peer-to-peer connection; and the first computing node receives the one or more second program files from the third computing node over the peer-to-peer connection and installs the second software program using the one or more second program files along with installing the first software program.

4. The system of claim 1, wherein the processor is configured to determine the geographically nearest second computing node to the first computing node by:

searching, based on the determined first software program that is to be installed at the first computing node and the geolocation associated with the first computing node, a list of the plurality of computing nodes, wherein each computing node in the list is at least associated with a geolocation of the computing node and one or more software programs installed at the computing node; and determining, based on the searching, a geographically nearest computing node to the first computing node that has the first software program installed, wherein the determined geographically nearest computing node is the second computing node.

5. The system of claim 4, wherein:

the error message received from the first computing node further comprises a first geographical region where the first computing node is located;

each computing node from the list is further associated with a geographical region where the computing node is located;

the processor is further configured to search the list of computing nodes by:

searching from only those computing nodes in the list that are located in the first geographical region where the first computing node is located.

6. The system of claim 4, wherein:

each computing node from the list is tagged as active or inactive, wherein an active tag indicates that the computing node is operating normally and an inactive tag indicates that the computing node is not operational;

the processor is further configured to search the list of computing nodes by:

searching from only those computing nodes in the list that are tagged as active.

7. The system of claim 1, wherein:

the processor is further configured to transmit the first command to the second computing node over a peer-to-peer connection between the second computing node and the first computing node;

the second computing node transmits the one or more first program files to the first computing node at the node address associated with the first computing node over the first peer-to-peer connection; and the first computing node receives the one or more first program files from the second computing node over the first peer-to-peer connection.

8. The system of claim 1, wherein the plurality of computing nodes comprises Automated Teller Machines (ATMs).

9. A method for resolving a malfunction associated with a computing node, the method comprising:

receive an error message from a first computing node of a plurality of computing nodes connected to a, wherein the error message indicates a malfunction associated with the first computing node and comprises a first machine identity (ID) associated with the first computing node, a node address associated with the first computing node, a geolocation associated with the first computing node, and a first error code generated by the first computing node relating to the malfunction;

training a machine learning model based on the library of known error codes to determine one or more software programs based on a candidate error code;

inputting the first error code to the trained machine learning model to determine a first software program that is to be installed at the first computing node to resolve the malfunction associated with the first computing node;

determine, based at least on the determined first software program that is to be installed at the first computing node and the geolocation associated with the first computing node, at least one geographically nearest second computing node to the first computing node that comprises the first software program to be installed at the first computing node; and transmit a first command to the second computing node to transfer one or more first program files associated with the first software program from the second computing node to the first computing node, wherein the first command at least comprises the first machine ID associated with the first computing node, a first program ID associated with the first software program, and the node address associated with the first computing node;

wherein:

the second computing node transmits the one or more first program files to the first computing node at the node address associated with the first computing node; and the first computing node receives the one or more first program files from the second computing node and installs the first software program using the one or more first program files.

10. The method of claim 9, wherein determining the first software program that is to be installed at the first computing node comprises:

searching a library of known error codes based on the first error code received in the error message, wherein:

the library of known error codes comprises a plurality of known error codes;

each known error code from the library is mapped to a software program that is known to cause a malfunction associated with the known error code and that is to be re-installed or updated at a respective computing node to resolve the malfunction;

determining, based on the searching, a known error code from the library that matches with the first error code received in the error message; and determining that the first software program is mapped to the error code.

11. The method of claim 9, wherein:

the error message further comprises a second error code generated by the first computing node relating to the malfunction associated with the first computing node;

further comprising:

determining, based on the second error code, a second software program that is to be installed at the first computing node to resolve the malfunction associated with the first computing node;

determining, based at least on the determined second software program that is to be installed at the first computing node and the geolocation associated with the first computing node received in the error message, at least one geographically nearest third computing node to the first computing node that comprises the second software program to be installed at the first computing node; and transmitting a second command to the third computing node for transferring one or more second program files to the first computing node over a peer-to-peer connection between the third computing node and the first computing node, wherein the second command at least comprises the first machine ID associated with the first computing node, a second program ID associated with the second software program, and the node address associated with the first computing node;

wherein:

the third computing node transmits the one or more second program files to the first computing node at the node address associated with the first computing node over the peer-to-peer connection; and the first computing node receives the one or more second program files from the third computing node over the peer-to-peer connection and installs the second software program using the one or more second program files along with installing the first software program.

12. The method of claim 9, wherein determining the geographically nearest second computing node to the first computing node comprises:

searching, based on the determined first software program that is to be installed at the first computing node and the geolocation associated with the first computing node, a list of the plurality of computing nodes, wherein each computing node in the list is at least associated with a geolocation of the computing node and one or more software programs installed at the computing node; and determining, based on the searching, a geographically nearest computing node to the first computing node that has the first software program installed, wherein the determined geographically nearest computing node is the second computing node.

13. The method of claim 12, wherein:

the error message received from the first computing node further comprises a first geographical region where the first computing node is located;

each computing node from the list is further associated with a geographical region where the computing node is located;

searching the list of computing nodes comprises:

searching from only those computing nodes in the list that are located in the first geographical region where the first computing node is located.

14. A non-transitory computer-readable medium storing instructions that when executed by a processor causes the processor to:

receive an error message from a first computing node of a plurality of computing nodes connected to a, wherein the error message indicates a malfunction associated with the first computing node and comprises a first machine identity (ID) associated with the first computing node, a node address associated with the first computing node, a geolocation associated with the first computing node, and a first error code generated by the first computing node relating to the malfunction;

train a machine learning model based on the library of known error codes to determine one or more software programs based on a candidate error code;

input the first error code to the trained machine learning model to determine a first software program that is to be installed at the first computing node to resolve the malfunction associated with the first computing node;

determine, based at least on the determined first software program that is to be installed at the first computing node and the geolocation associated with the first computing node, at least one geographically nearest second computing node to the first computing node that comprises the first software program to be installed at the first computing node; and transmit a first command to the second computing node to transfer one or more first program files associated with the first software program from the second computing node to the first computing node, wherein the first command at least comprises the first machine ID associated with the first computing node, a first program ID associated with the first software program, and the node address associated with the first computing node;

wherein:

the second computing node transmits the one or more first program files to the first computing node at the node address associated with the first computing node; and the first computing node receives the one or more first program files from the second computing node and installs the first software program using the one or more first program files.

15. The non-transitory computer-readable medium of claim 14, wherein determining the first software program that is to be installed at the first computing node comprises:

searching a library of known error codes based on the first error code received in the error message, wherein:

the library of known error codes comprises a plurality of known error codes;

each known error code from the library is mapped to a software program that is known to cause a malfunction associated with the known error code and that is to be re-installed or updated at a respective computing node to resolve the malfunction;

determining, based on the searching, a known error code from the library that matches with the first error code received in the error message; and determining that the first software program is mapped to the error code.

16. The non-transitory computer-readable medium of claim 14, wherein:

the error message further comprises a second error code generated by the first computing node relating to the malfunction associated with the first computing node;

the instructions further cause the processor to:

determine, based on the second error code, a second software program that is to be installed at the first computing node to resolve the malfunction associated with the first computing node;

determine, based at least on the determined second software program that is to be installed at the first computing node and the geolocation associated with the first computing node received in the error message, at least one geographically nearest third computing node to the first computing node that comprises the second software program to be installed at the first computing node; and transmit a second command to the third computing node for transferring one or more second program files to the first computing node over a peer-to-peer connection between the third computing node and the first computing node, wherein the second command at least comprises the first machine ID associated with the first computing node, a second program ID associated with the second software program, and the node address associated with the first computing node;

wherein:

the third computing node transmits the one or more second program files to the first computing node at the node address associated with the first computing node over the peer-to-peer connection; and the first computing node receives the one or more second program files from the third computing node over the peer-to-peer connection and installs the second software program using the one or more second program files along with installing the first software program.

17. The non-transitory computer-readable medium of claim 14, wherein determining the geographically nearest second computing node to the first computing node comprises:

searching, based on the determined first software program that is to be installed at the first computing node and the geolocation associated with the first computing node, a list of the plurality of computing nodes, wherein each computing node in the list is at least associated with a geolocation of the computing node and one or more software programs installed at the computing node; and determining, based on the searching, a geographically nearest computing node to the first computing node that has the first software program installed, wherein the determined geographically nearest computing node is the second computing node.

* * * * *